US012023915B2

United States Patent
Minamikawa et al.

(10) Patent No.: US 12,023,915 B2
(45) Date of Patent: Jul. 2, 2024

(54) PRINTING APPARATUS

(71) Applicant: BROTHER KOGYO KABUSHIKI KAISHA, Nagoya (JP)

(72) Inventors: Shunsuke Minamikawa, Nagoya (JP); Koichi Tsugimura, Nagoya (JP); Yusuke Arai, Nagoya (JP); Isao Kobayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/818,998

(22) Filed: Aug. 11, 2022

(65) Prior Publication Data

US 2023/0094160 A1 Mar. 30, 2023

(30) Foreign Application Priority Data

Sep. 30, 2021 (JP) ................................ 2021-160226

(51) Int. Cl.
*B41J 11/66* (2006.01)
*B41J 11/00* (2006.01)
*B41J 11/70* (2006.01)

(52) U.S. Cl.
CPC ............ *B41J 11/663* (2013.01); *B41J 11/003* (2013.01); *B41J 11/0095* (2013.01); *B41J 11/706* (2013.01)

(58) Field of Classification Search
CPC ....... B41J 11/003; B41J 11/663; B41J 11/706; B41J 11/66; B41J 11/68; B41J 11/70; B41J 11/666

See application file for complete search history.

(56) References Cited

U.S. PATENT DOCUMENTS

| 2021/0178785 | A1 | 6/2021 | Miura | |
| 2022/0072878 | A1* | 3/2022 | Konno | B41J 11/0065 |
| 2022/0276813 | A1* | 9/2022 | Miyahara | G06F 3/1256 |

FOREIGN PATENT DOCUMENTS

| JP | 2021-94784 A | 6/2021 | |
| JP | 2021160840 A | * 10/2021 | B41J 11/663 |

OTHER PUBLICATIONS

Takahashi, Machine TranslationofJP-2021160840-A, 2021 (Year: 2021).*

* cited by examiner

*Primary Examiner* — Scott A Richmond
(74) *Attorney, Agent, or Firm* — Merchant & Gould P.C.

(57) ABSTRACT

A printing apparatus, having a container to store a printing medium therein, an acquisition device to acquire image data, a printing device to print an image on the printing medium, a cutter assembly to cut the printing medium, and a controller, is provided. In a case where a size of the image contained in the image data acquired by the acquisition device is smaller than a size of the printing medium stored in the container, the controller generates rotated image data containing a rotated image, which is an image rotated from an original posture of the image in the image data acquired by the acquisition device, controls the printing device based on the generated rotated image data to print the rotated image on the printing medium, and controls the cutter assembly to cut the printing medium having the rotated image printed by the printing device thereon.

3 Claims, 5 Drawing Sheets

PRINTING APPARATUS

REFERENCE TO RELATED APPLICATIONS

This application claims priority from Japanese Patent Application No. 2021-160226, filed on Sep. 30, 2021. The entire content of the priority application is incorporated herein by reference.

BACKGROUND ART

A printing apparatus that may cut a printing medium after printing an image on the printing medium is known. Thus, printing apparatuses may be expected to have functions additionally to the image printing function. Meanwhile, settings for such additional functions, such as how an image may be laid out on the printing medium or how a determination whether the printing medium is to be cut after printing may be handled, may not always be considered sufficiently.

Generally, those settings may be processed by a printer driver that may be run on a data creating device, e.g., a computer, a smartphone, etc., which is capable of creating print data.

DESCRIPTION

Meanwhile, if the printer driver is not equipped with functions to process those settings for cutting, the printer driver may not create print data with the settings applied thereto. In this regard, the printer may print an image on a printing medium but may not cut the printing medium after printing the image. Therefore, a user may eventually achieve a printed material in an undesired form, and the printing medium with the printed image may be wasted.

The present disclosure is advantageous in that a printing apparatus, in which processes required for cutting a printing medium may be conducted independently from functions in a printer driver, is provided.

Figure 1:
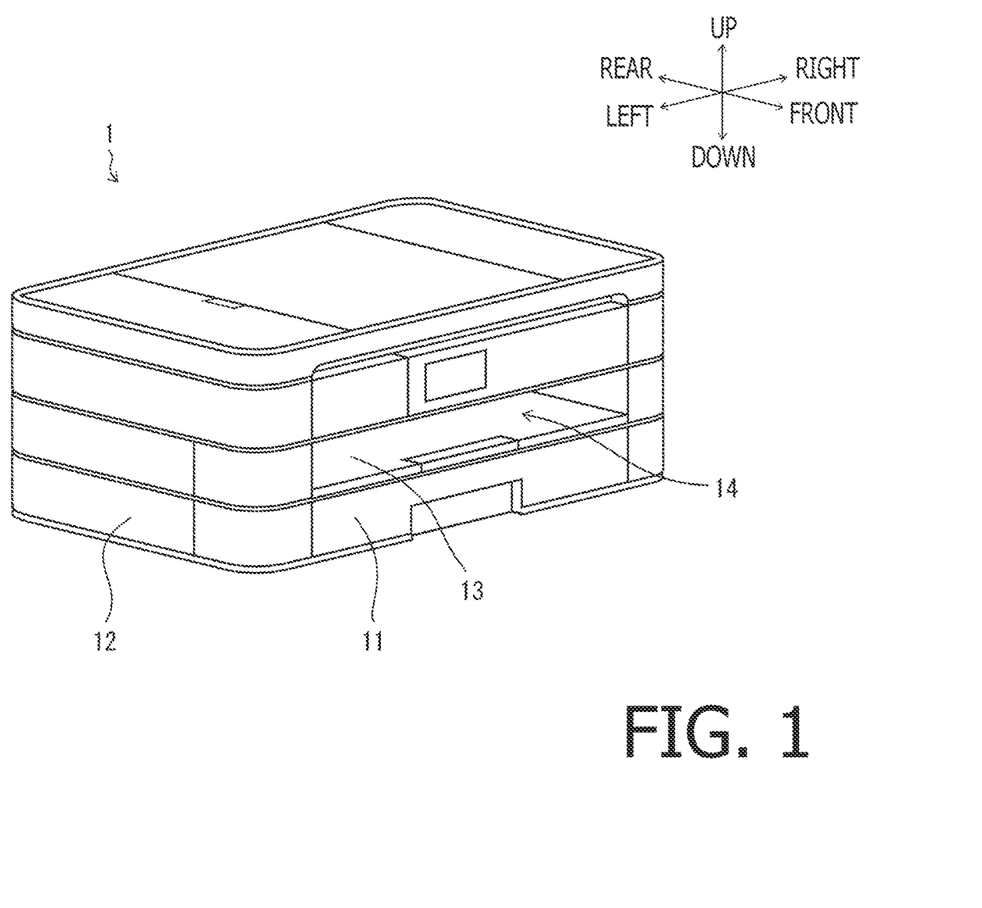
FIG. 1 is a perspective view of a printer.
Figure 2:
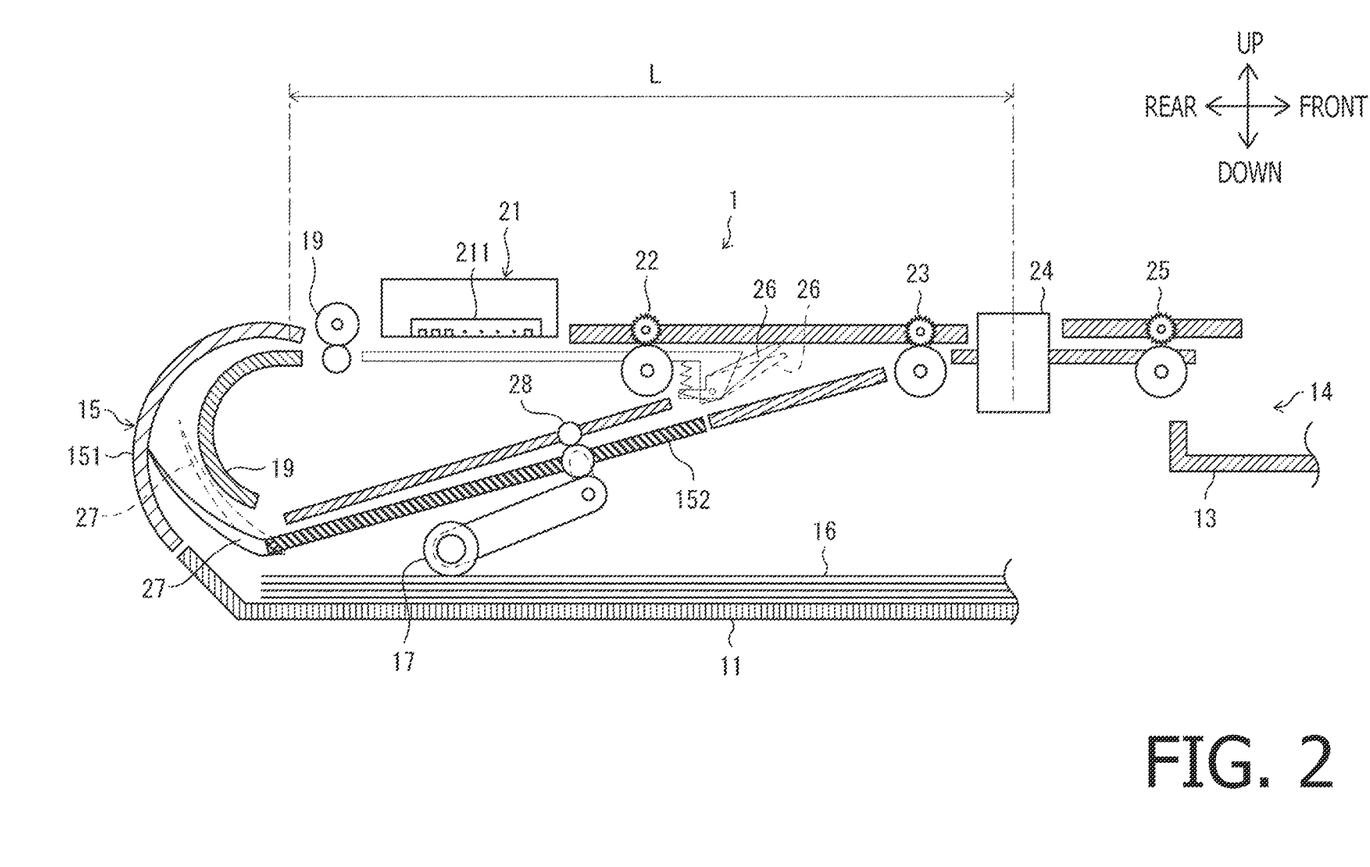
FIG. 2 is a cross-sectional view of the printer.

Hereinafter, the exemplary embodiment according to an aspect of the present disclosure will be described in detail with reference to the accompanying drawings. FIG. 1 is a perspective view of a printer 1. FIG. 2 is a cross-sectional view of the printer 1.

The printer 1 may include a multifunction peripheral machine (MFP) having a plurality of functions including a printing function, a scanning function, a copying function, and a facsimile transmission/receiving function. In the following description, positional relation within the printer 1 and each part or item included in the printer 1 will be mentioned on basis of a user's position to ordinarily use the printer 1 in a usable condition as shown in FIG. 1, with reference to an orientation (up, down, right, left, front, rear) indicated by the bi-directionally pointing arrows.

[Overall Configuration of Printer 1]

The printer 1 may have, as shown in FIG. 1, an overall shape of a six-sided rectangular box. The printer 1 may have a double-face inkjet-printing function, by which images may be recorded in ink on both sides of a printing sheet. Optionally, the printer 1 may be an electro-photographic printer capable of printing images on a printing sheet electro-photographically.

As shown in FIG. 1, the printer 1 has a housing 12 that accommodates components of the printer 1. The housing 12 has a feeder tray 11 in a lower area therein. At an upper position with respect to the feeder tray 11, an ejection tray 13 is arranged. At an upper position with respect to the ejection tray 13, an opening 14 is formed.

[Internal Configuration of Printer 1]

As shown in FIG. 2, the printer 1 has the feeder tray 11, the ejection tray 13, and a conveyer 15, which are arranged inside the housing 12. The conveyer 15 includes a main conveyer path 151 extending from the feeder tray 11 to the ejection tray 13 and a reverse conveyer path 152 branched from the main conveyer path 151.

The feeder tray 11 may contain and store one or more printing sheets 16 therein. The conveyer 15 may convey the printing sheet 16 drawn from the feeder tray 11 through the main conveyer path 151 to, for example, an end of the main conveyer path 151 and eject the printing sheets outside the main conveyer path 151 to place on the ejection tray 13. For another example, the conveyer 15 may convey the printing sheet 16 conveyed through the main conveyer path 151, reverse the printing sheet 16 through the reverse conveyer path 152 to return the printing sheet 16 to the main conveyer path 151 in a vertically reversed posture, and eject the printing sheet 16 outside the main conveyer path 151 to place on the ejection tray 13. The conveyer 15 may draw the printing sheet 16 from the feeder tray 11 to the main conveyer path 151 with a feeder roller 17 located above the feeder tray 11. The main conveyer path 151 curves frontward in an arc starting from a position in the vicinity of an end of the feeder tray 11.

In the main conveyer path 151, a first conveyer roller 19 having a pair of rollers, a printing device 21, a second conveyer roller 22 having a pair of rollers, a third conveyer roller 23 having a pair of rollers, a cutter assembly 24, and a fourth conveyer roller 25 having a pair of rollers are arranged in this recited order from an upstream side toward a downstream side in a conveying direction, in which the printing sheet 16 may be conveyed.

The first conveyer roller 19 is located at a position upstream from the printing device 21 in the conveying direction. The second conveyer roller 22 is located between the printing device 21 and an upstream end of the reverse conveyer path 152 in the conveying direction. The third conveyer roller 23 is located between the upstream end of the reverse conveyer path 152 and the cutter assembly 24. The fourth conveyer roller 25 is located between the cutter assembly 24 and a downstream end of the main conveyer path 151 in the conveying direction and may work as an ejection roller pair that may eject the printing sheet 16 at the ejection tray 13.

The printing device 21 includes a recording head 211 to record an image and may print an image with the recording head 211 on the printing sheet 16 in an inkjet-printing style. The cutter assembly 24 may cut the printing sheet 16 with a cutting blade (not shown) into an upstream part and a downstream part in the conveying direction.

The reverse conveyer path 152 has the upstream end, which is located at a position upstream from the third conveyer roller 23, and a downstream end, which is located at a position in the vicinity of the starting point of the main conveyer path 151. At the upstream end of the reverse conveyer path 152, a first flap 26 is located, and at the downstream end of the reverse conveyer path 152, a second flap 27 is located. The first flap 26 and the second flap 27 may move to switch conveying directions of the printing sheet 16. In the reverse conveyer path 152, a fifth conveyer roller 28 having a pair of rollers is arranged. The first through fifth conveyer rollers 19, 22, 23, 23, 28 may nip the printing sheet 16 between the paired rollers and convey the printing sheet 16.

[Configuration of Controlling System]

Figure 3:
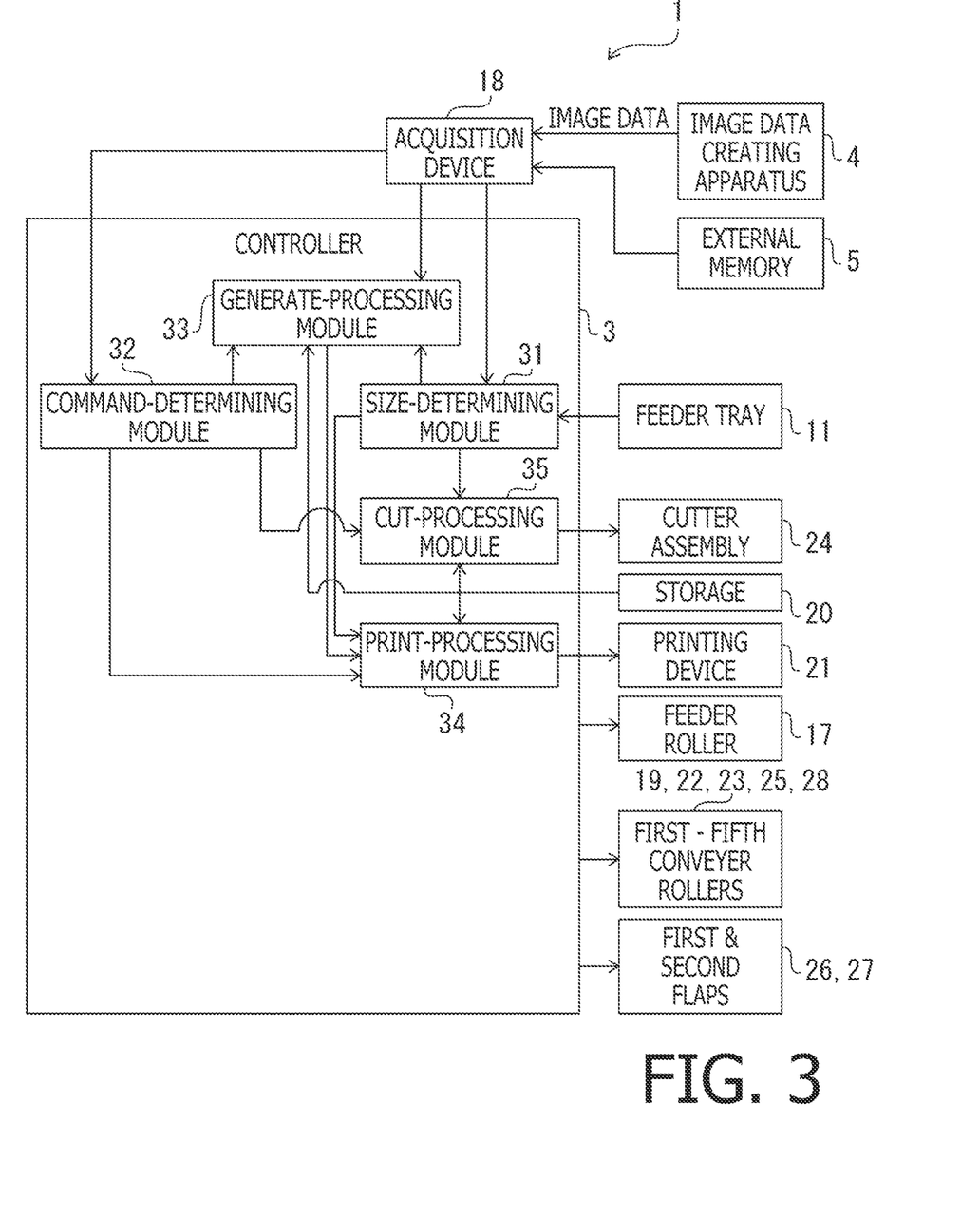
FIG. 3 is a block diagram to illustrate a controlling system in the printer.

FIG. 3 is a block diagram to illustrate a controlling system in the printer 1. As shown in FIG. 3, the printer 1 has a controller 3 including, for example, a microcomputer. The controller 3 is connected with the feeder roller 17, an acquisition device 18, the first through fifth conveyer rollers 19, 22, 23, 25, 28, a storage 20, the printing device 21, the cutter assembly 24, and the first and second flaps 26, 27. The controller 3 may control actions of the printing device 21, the cutter assembly 24, the first and second flaps 26, 27, and the conveyer 15, which includes the feeder roller 17 and the first through fifth conveyer rollers 19, 22, 23, 25, 28.

In particular, the controller 3 may control actions of the feeder roller 17, the first through fifth conveyer rollers 19, 22, 23, 25, 28, and the first and second flaps 26, 27 by controlling drivable devices, e.g., motors, each one or more of which may drive the feeder roller 17, the first through fifth conveyer rollers 19, 22, 23, 25, 28, and the first and second flaps 26, 27, respectively.

The first and second flaps 26, 27 are movable under the control of the controller 3 between a reverse-guiding position, as illustrated in solid lines in FIG. 2, and a retracted position, as illustrated in broken lines in FIG. 2. The reverse-guiding position is a position, at which the first flap 26 may guide the printing sheet 16 being conveyed in a reverse direction opposite to the conveying direction from the main conveyer path 151 to the reverse conveyer path 152 by reverse rotation of the third conveyer roller 23, and at which the second flap 27 may guide the printing sheet 16 from the reverse conveyer path 152 to the main conveyer path 151. The retracted position is a position, at which the first and second flaps 26, 27 may not interfere with the printing sheet 16 being conveyed in the main conveyer path 151 from the feeder tray 11 toward the ejection tray 13.

The controller 3 may control the printing device 21 to print an image based on image data obtained from an image data creating apparatus 4 or an external memory 5. The image data creating apparatus 4 may be, for example, a generic computer that may create image data to be used by the printer 1 to print an image. The image data creating apparatus 4 has a printer driver to control the printer 1 installed therein, and the printer driver enables minifying or magnifying of the image. The external memory 5 may include, for example, a universal serial bus (USB) memory, which may store the image data created by the image data creating apparatus 4.

The acquisition device 18 may acquire the image data from one of the image data creating apparatus 4 and the external memory 5. The acquisition device 18 includes a communication interface, through which the image data may be acquired from the image data creating apparatus 4. The acquisition device 18 includes a USB interface, through which the image data may be acquired from the external memory 5.

The storage 20 may store information indicating whether either a cut setting or a non-cut setting is applied to the printer 1. The cut setting is an option, which causes a cut-processing module 35 in the controller 3 to conduct a cutting process. For example, the cut setting may be represented by a number "1" in a single-bit area in the storage 20.

The non-cut setting is an option, which causes the cut-processing module 35 not to conduct the cutting process. For example, the non-cut setting may be represented by a number "0" in the single-bit area in the storage 20.

The feeder tray 11 may store the printing sheets 16 in a predetermined size, e.g., A4 size. The printer 1 may either have a single feeder tray 11 or a plurality of feeder trays 11. The feeder tray 11 has a sheet-size setting assigned thereto, which indicates the size of the printing sheets 16 stored therein.

The controller 3 includes a size-determining module 31, a command-determining module 32, a generate-processing module 33, a print-processing module 34, and the cut-processing module 35.

The size-determining module 31 may determine whether a sheet size is a cut-applicable sheet size. The sheet size is the size of the printing sheets 16 related to the sheet-size setting assigned to the feeder tray 11. The cut-applicable sheet size is a size of the printing sheet 16 that may be cut into a smaller size in consideration of an image size being a size of the image contained in the image data acquired by the acquisition device 18. For example, in a case where an A4-sized printing sheet 16 is to be cut into an A5-sized printing sheet 16, which is a half of the A4 size, the image size is A5, and the cut-applicable sheet size is A4.

The image size is smaller than the cut-applicable sheet size. More specifically, when the image size is a predetermined size, the cut-applicable sheet size is twice as large as the predetermined size. The size-determining module 31 may determine whether the sheet size is the cut-applicable sheet size by comparing the image size with the sheet size based on the setting assigned to the feeder tray 11.

The command-determining module 32 may determine whether a cut command CUTTYPE is appended to the image data acquired by the acquisition device 18. The cut command CUTTYPE may include "CUT," which is an example of a command for cutting, to cause the cutter assembly 24 to perform a cutting action, and "NONE," which is an example of a command for not cutting, to cause the cutter assembly 24 not to perform the cutting action. The command-determining module 32 determining that the cut command CUTTYPE is appended to the image data may then determine whether the cut command CUTTYPE is either "CUT" or "NONE."

The generate-processing module 33 may conduct a generating process, in which the image is laid out to fit in the printing sheet 16 after the cut. The generate-processing module 33 may conduct the generating process including a rotating process and a position-converting process. In the rotating process, a rotated image data containing a rotated image, in which the image in the image data is rotated, is created. In the position-converting process, a position of the rotated image to be printed is converted so that the rotated image may be printed in an area being a half size of the printing sheet 16. The generate-processing module 33 may conduct the rotating process and the position-converting process not separately but simultaneously.

The generate-processing module 33 may conduct the generating process according to a determination by the command-determining module 32 that the cut command CUTTYPE is "CUT." In the following description, the determination by the command-determining module 32 that the cut command CUTTYPE is "CUT" may be called as "CUT determination." The generate-processing module 33 may conduct the generating process based on a determination by the size-determining module 31 that the sheet size is the cut-applicable sheet size and the cut setting stored in the storage 20. In the following description, the determination by the size-determining module 31 that the sheet size is the cut-applicable sheet size may be called as "cut-applicable sheet size determination." Alternatively, based on a determination by the size-determining module 31 that the sheet size is not the cut-applicable sheet size, a determination by the command-determining module 32 that the cut command CUTTYPE is "NONE," or the non-cut setting stored in the storage 20, the generate-processing module 33 may output the image data acquired by the acquisition device 18 as it is without conducting the generating process. In the following description, the determination by the size-determining module 31 that the sheet size is not the cut-applicable sheet size may be called as "cut-inapplicable size determination," and the determination by the command-determining module 32 that the cut command CUTTYPE is "NONE" may be called as "NONE determination."

The print-processing module 34 may conduct a printing process, in which the printing device 21 is operated to print the rotated image or the image without rotation based on the rotated image data or the image data output from the generate-processing module 33 on the printing sheet 16 fed from the feeder tray 11. The print-processing module 34 may conduct the printing process with the rotated image data based on the cut-applicable sheet size determination by the size-determining module 31 and the cut setting stored in the storage 20. The print-processing module 34 may conduct the printing process with the rotated image data based on the CUT determination by the command-determining module 32. Alternatively, based on the cut-inapplicable size determination by the size-determining module 31, the NONE determination by the command-determining module 32, or the non-cut setting stored in the storage 20, the print-processing module 34 may conduct the printing process with the image data.

The cut-processing module 35 may conduct a cutting process. In the cutting process, the cutter assembly 24 is operated to cut the printing sheet 16, on which the image is printed by the print-processing module 34. The cut-processing module 35 may conduct the cutting process based on the cut-applicable size determination by the size-determining module 31 and the cut setting stored in the storage 20. The cut-processing module 35 may conduct the cutting process based on the CUT determination by the command-determining module 32. Alternatively, based on the cut-inapplicable size determination by the size-determining module 31, the NONE determination by the command-determining module 32, or the non-cut setting stored in the storage 20, the cut-processing module 35 may not conduct the cutting process. Optionally, the cut-processing module 35 may conduct the cutting process either before or after the printing process by the print-processing module 34.

[Actions in Printer 1]

Figure 4:
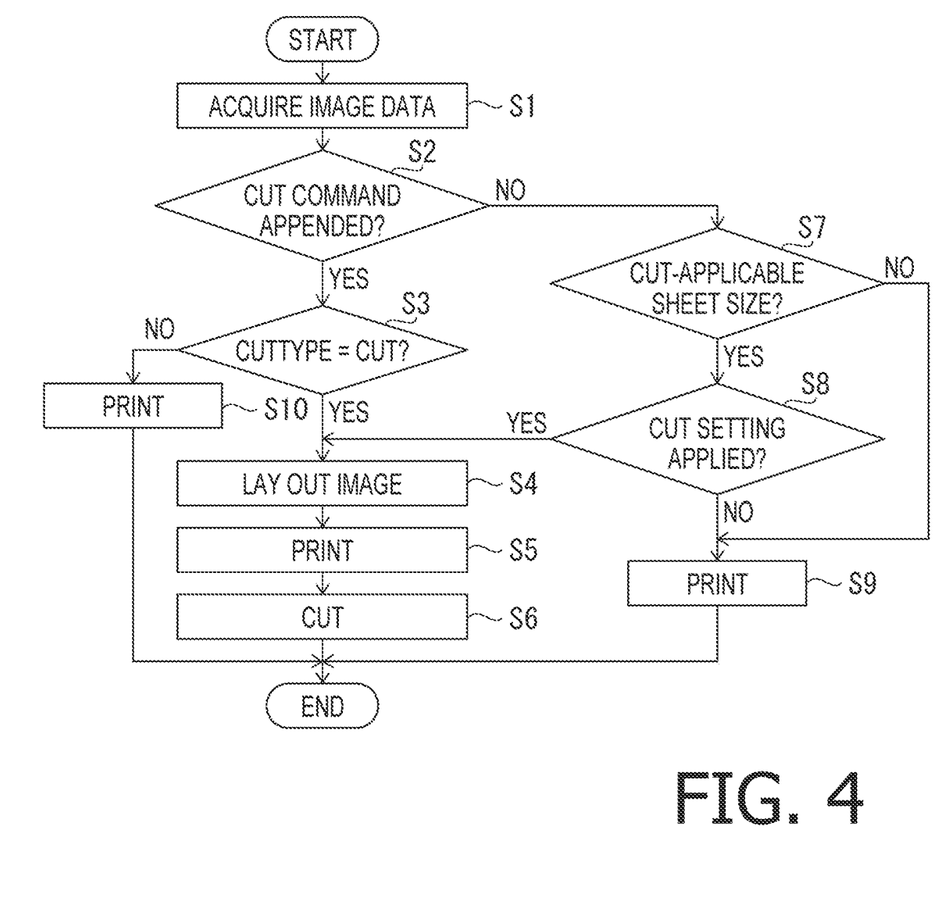
FIG. 4 is a flowchart to illustrate a controlling flow of printing and cutting by a controller in the printer.

Actions in the printer 1 configured as above will be described below. FIG. 4 is a flowchart to illustrate a flow of actions conducted by the controller 3 to print an image on the printing sheet 16 with the printer 1.

As shown in FIG. 4, the controller 3 acquires image data from the image data creating apparatus 4 or the external memory 5 (S1).

The command-determining module 32 determines whether the cut command CUTTYPE is appended to the image data having been acquired (S2). If the command-determining module 32 determines that the cut command CUTTYPE is appended to the image data (S2: YES), the command-determining module 32 determines whether the cut command CUTTYPE is "CUT" (S3).

If the command-determining module 32 determines that the cut command CUTTYPE is "CUT" (S3: YES), the generate-processing module 33 conducts the generating process, in which layout of the image in the image data acquired by the acquisition device 18 is changed (S4). In particular, the generate-processing module 33 may rotate the image by 90 degrees and locate the image in a halved area, which is a half of the printing sheet 16.

Next, the print-processing module 34 conducts the printing process (S5). Thereby, the printing device 21 may print the rotated image in the halved area in the printing sheet 16 based on the rotated image data. Thereafter, the cut-processing module 35 operates the cutter assembly 24 to cut the printing sheet 16 in half (S6).

Optionally, the processes in S5 and S6 may be conducted in a switched order. Further optionally, the process in S6 may be conducted prior to the processes in S4-S5.

In S2, if the command-determining module 32 determines that the cut command CUTTYPE is not appended to the image data (S2: NO), the size-determining module 31 may determine whether the sheet size is the cut-applicable sheet size (S7). In S7, if the size-determining module 31 determines that the sheet size is the cut-applicable sheet size (S7: YES), the generate-processing module 33, the print-processing module 34, and the cut-processing module 35 determine whether the information indicating the cut setting is stored in the storage 20 (S8).

In S8, if the generate-processing module 33, the print-processing module 34, and the cut-processing module 35 determine that the information indicating the cut setting is stored in the storage 20 (S8: YES), the flow proceeds to S4. On the other hand, if it is determined that the information indicating the cut setting is not stored in the storage 20 (S8: NO), the print-processing module 34 conducts the printing process (S9), and the flow ends thereat. Meanwhile, in S7, if the size-determining module 31 determines that the sheet size is not the cut-applicable sheet size (S7: NO), the flow proceeds to S9.

In S3, if the command-determining module 32 determines that the cut command CUTTYPE is not "CUT," in other words, the cut command CUTTYPE is "NONE" (S3: NO), the print-processing module 34 conducts the printing process (S10), and the flow ends thereat.

Figure 5:
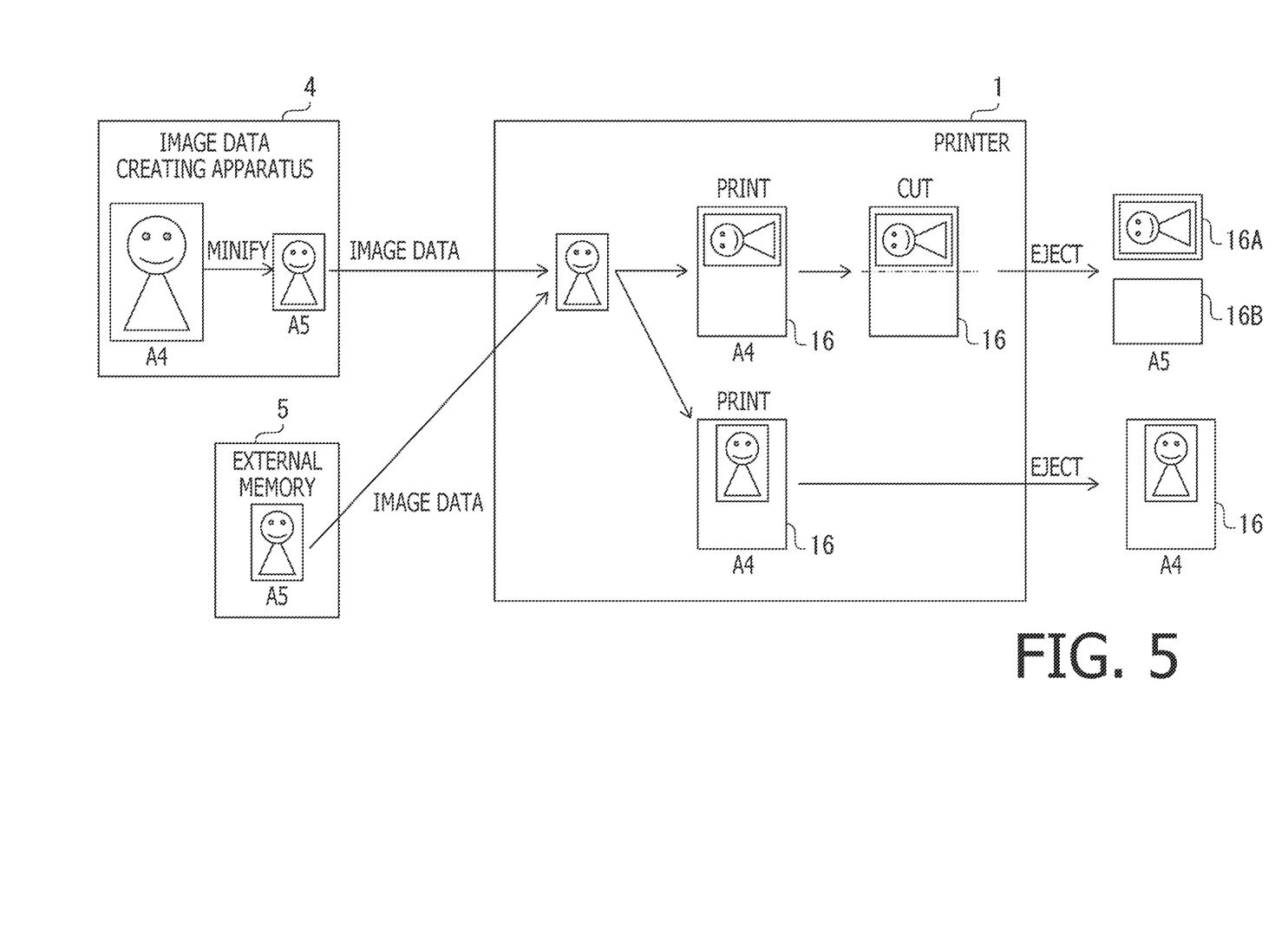
FIG. 5 illustrates a procedure to print and cut a printing medium based on image data in the printer.

Next, actions in the printer 1 to print the A5-sized image in the halved area in the A4-sized printing sheet 16 and cut the printing sheet 16 will be described below. FIG. 5 illustrates a procedure to print the image and cut the printing sheet 16 based on image data in the printer 1.

As shown in FIG. 5, the image data creating apparatus 4 may minify an A4-sized image to create an A5-sized image and transmit image data for the A5-sized image to the printer 1. The printer 1 may receive and acquire the image data. For another example, the printer 1 may acquire the image data from the external memory 5.

When the printing sheet 16 is to be cut, the controller 3 in the printer 1 conducts, following affirmative determinations in S2 and S3 (S2: YES, S3: YES) or following a negative determination in S2 (S2: NO) and affirmative determinations in S7 and S8 (S7: YES, S8: YES), the image layout process in S4 and the printing process in S5. Further the controller 3 conducts the cutting process in S6 to cut the printing sheet 16. The generate-processing module 33, based on the acquired image data, rotates the A5-sized image by 90 degrees and locates the rotated image in an upper-half area in the A4-sized printing sheet 16 in a horizontally lying posture. The print-processing module 34 operates the printing device 21 to print the A5-sized rotated image on the printing sheet 16. The cut-processing module 35 operates the cutter assembly 24 to cut the A4-sized printing sheet 16 with the image printed thereon in half.

As a result, printing sheets 16A, 16B, which are one and the other halves of the A4-sized printing sheet 16, are ejected from the printer 1. On the printing sheet 16A, the rotated image is printed, but on the printing sheet 16B, no image is printed.

When the printing sheet 16 it not to be cut, on the other hand, the controller 3 in the printer 1 conducts, following a negative determination in S2 (S2: NO), an affirmative determination in S7 (S7: YES), and a negative determination in S8 (S8: NO), the printing process in S9. The print-processing module 34 operates the printing device 21 to print the A5-sized image in the original posture without rotating on the printing sheet 16. As a result, the printing sheet 16 with the A5-sized image printed thereon in a vertically standing posture is ejected.

In the present example, the printing sheet 16 may be cut after printing the image; however, optionally, as mentioned earlier, the printing sheet 16 may be cut before printing the image. In order to conduct the processes in the latter order, the cutter assembly 24 needs to be located on an upstream side of the printing device 21 in the main conveyer path 151 (see FIG. 2).

In the present example, moreover, the A5-sized image may be located in the upper half of the A4-sized printing sheet 16 in FIG. 5; however, optionally, the A5-sized image may be located in the lower half of the A4-sized printing sheet 16 in FIG. 5. For another example, when the printer 1 acquires two (2) A5-sized images, the printer 1 may print one and the other of the two images on one and the other halves of the same A4-sized printing sheet 16, respectively, and may cut the A4-sized printing sheet 16 in half to achieve the two printing sheets 16A, 16B.

[Benefits by Printer 1]

When the image size is smaller than the size of the printing sheet 16, more specifically, when the image size is as small as a half of the size of the printing sheet 16, the generating process, the printing process, and the cutting process may be conducted in the generate-processing module 33, the print-processing module 34, and the cut-processing module 35, respectively. Accordingly, without a specific printer driver, the printer 1 may acquire rotated image data of the rotated image and cut the printing sheet 16, on which the rotated image based on the rotated image data is printed. Therefore, the printing sheet 16B, which remains blank without an image printed thereon, may be provided for reuse, and the printing sheet 16 may not be wasted.

[Examples of Implementation by Software]

The functions of the printer 1 may be implemented by the controller 3 executing programs that may cause a computer to function as the printer 1 or that may cause the computer to function as controlling blocks in the printer 1, e.g., the components in the controller 3.

In this regard, the printer 1 includes a computer having at least one controller, e.g., a processor, and at least one storage, e.g., a memory, as hardware devices to carry out the programs. Thus, the functions described in the above embodiment may be attained through the controller and the storage executing the programs.

The program may be recorded in one or more computer-readable storage media. The recordable storage media may or may not be provided to the printer 1. If the printer 1 is not provided with the recordable storage media, the program may be delivered to the printer 1 through wired or wireless communication media.

Moreover, one or more of the controlling blocks may be implemented by logic circuits. For example, an integrated circuit, in which logic circuits to function as the controlling blocks are formed, may be included in the scope of the present disclosure. For another example, the functions of the controlling blocks may be implemented by a quantum computer.

[Summary]

The printer 1 has the feeder tray 11, the acquisition device 18, the printing device 21, the cutter assembly 24, and the controller 3. The feeder tray 11 may store the printing sheet 16 therein. The acquisition device 18 may acquire the image data. The printing device 21 may print an image on the printing sheet 16 based on the image data acquired by the acquisition device 18. The cutter assembly 24 may cut the printing sheet 16. In a case where a size of the image contained in the image data acquired by the acquisition device 18 is smaller than a size of the printing medium stored in the feeder tray 11, the controller 3 is configured to generate rotated image data containing a rotated image, which is an image rotated from an original posture of the image in the image data acquired by the acquisition device 18, control the printing device 21 based on the generated rotated image data to print the rotated image on the printing sheet 16, and control the cutter assembly 24 to cut the printing medium having the rotated image printed by the printing device 21 thereon.

According to the printer 1 in this configuration, when the size of the image is smaller than the size of the printing sheet 16 stored in the feeder tray 11, the printing process and the cutting process are conducted. Therefore, without a specific printer driver, the printer 1 may acquire rotated image data of the rotated image and cut the printing sheet 16, on which the rotated image based on the rotated image data is printed. Therefore, wasting of the printing sheet 16 may be reduced.

The controller 3 may, in a case where the acquisition device 18 acquires the image data containing the image in a predetermined size, on condition that the printing sheet 16 having a size twice as large as the predetermined size is stored in the feeder tray 11, generate the rotated image data, control the printing device 21 based on the generated rotated image data to print the rotated image on the printing sheet 16, and control the cutter assembly 24 to cut the printing sheet 16 having the rotated image printed thereon. The controller 3 may, in the case where the acquisition device 18 acquires the image data containing the image in the predetermined size, on condition that the printing sheet 16 having the size twice as large as the predetermined size is not stored in the feeder tray 11, control the printing device 21 to print the image on the printing sheet 16 based on the image data acquired by the acquisition device 18 without generating the rotated image data and without controlling the cutter assembly 24 to cut the printing sheet 16.

According to the printer 1 in this configuration, if a printing sheet 16 having a size as twice as large the predetermined size is stored in the feeder tray 11, the rotated image data may be generated, and the printing sheet 16, on which the rotated image based on the rotated image data is printed, may be cut in half. Therefore, a series of actions that the A5-sized image is printed on the A4-sized printing sheet and the printing sheet 16 is cut in half may be performed easily.

The printer 1 has the storage 20 that may store information indicating whether one of the cut setting, which causes the controller 3 to control the cutter assembly 24 to cut the printing sheet 16 with the rotated image printed thereon, and the non-cut setting, which causes the controller 3 not to control the cutter assembly 24 to cut the printing sheet 16 with the rotated image printed thereon, is applied to the printer 1. In a case where the storage 20 stores the information indicating the non-cut setting is applied to the printer 1, the controller 3 may not to control the cutter assembly 24 to cut the printing sheet 16 with the rotated image printed thereon even in the case where the size of the image contained in the image data acquired by the acquisition device 18 is smaller than the size of the printing sheet 16 stored in the feeder tray 11.

According to the printer 1 in this configuration, the non-cut setting may be stored in the storage 20. Therefore, for example, when the size of the image is smaller than the size of the printing sheet 16 stored in the feeder tray 11, but if the printing sheet 16 may not necessarily be cut, the printing sheet 16 may not be cut forcibly but may be kept in the original size.

The controller 3 may, in a case where the cut command for cutting the printing sheet 16 is appended to the image data acquired by the acquisition device 18, generate the rotated image data, control the printing device 21 based on the generated rotated image data to print the rotated image on the printing sheet 16, and control the cutter assembly 24 to cut the printing sheet 16 having the rotated image printed thereon. The controller 3 may, in a case where the non-cut command for not cutting the printing sheet 16 is appended to the image data acquired by the acquisition device 18, control the printing device 21 to print the image on the printing sheet 16 based on the image data acquired by the acquisition device 18 without generating the rotated image data and without controlling the cutter assembly 24 to cut the printing sheet 16.

According to the printer 1 in this configuration, either the cut command or the non-cut command may be appended to the image data, and the generating process and the cutting process may be conducted or not conducted depending on the appended cut command or the non-cut command.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus, comprising:
a container configured to store a printing medium therein;
an acquisition device configured to acquire image data;
a printing device configured to print an image on the printing medium based on the image data acquired by the acquisition device;
a cutter assembly configured to cut the printing medium; and
a controller configured to, in a case where a size of the image contained in the image data acquired by the acquisition device is smaller than a size of the printing medium stored in the container:
generate rotated image data containing a rotated image, the rotated image being an image rotated from an original posture of the image in the image data acquired by the acquisition device,
control the printing device based on the generated rotated image data to print the rotated image on the printing medium, and
control the cutter assembly to cut the printing medium having the rotated image printed by the printing device thereon,
wherein the controller is configured to, in a case where the acquisition device acquires the image data containing the image in a predetermined size,
on condition that the printing medium having a size twice as large as the predetermined size is stored in the container, generate the rotated image data, control the printing device based on the generated rotated image data to print the rotated image on the printing medium, and control the cutter assembly to cut the printing medium having the rotated image printed thereon, and
on condition that the printing medium having the size twice as large as the predetermined size is not stored in the container, control the printing device to print the image on the printing medium based on the image data acquired by the acquisition device without generating the rotated image data and without controlling the cutter assembly to cut the printing medium.

2. A printing apparatus, comprising:
a container configured to store a printing medium therein;
an acquisition device configured to acquire image data;
a printing device configured to print an image on the printing medium based on the image data acquired by the acquisition device;
a cutter assembly configured to cut the printing medium;
a controller configured to, in a case where a size of the image contained in the image data acquired by the acquisition device is smaller than a size of the printing medium stored in the container:
generate rotated image data containing a rotated image, the rotated image being an image rotated from an original posture of the image in the image data acquired by the acquisition device,
control the printing device based on the generated rotated image data to print the rotated image on the printing medium, and
control the cutter assembly to cut the printing medium having the rotated image printed by the printing device thereon, and
a storage configured to store information indicating whether one of a cut setting, which causes the controller to control the cutter assembly to cut the printing medium with the rotated image printed thereon, and a non-cut setting, which causes the controller not to control the cutter assembly to cut the printing medium, is applied to the printing apparatus,
wherein, in a case where the storage stores the information indicating the non-cut setting is applied to the printing apparatus, the controller is configured not to control the cutter assembly to cut the printing medium even in the case where the size of the image contained in the image data acquired by the acquisition device is smaller than the size of the printing medium stored in the container.

3. A printing apparatus, comprising:
a container configured to store a printing medium therein;
an acquisition device configured to acquire image data;

a printing device configured to print an image on the printing medium based on the image data acquired by the acquisition device;

a cutter assembly configured to cut the printing medium; and a controller configured to, in a case where a size of the image contained in the image data acquired by the acquisition device is smaller than a size of the printing medium stored in the container:

generate rotated image data containing a rotated image, the rotated image being an image rotated from an original posture of the image in the image data acquired by the acquisition device, control the printing device based on the generated rotated image data to print the rotated image on the printing medium, and control the cutter assembly to cut the printing medium having the rotated image printed by the printing device thereon, wherein the controller is configured to, in a case where a cut command for cutting the printing medium is appended to the image data acquired by the acquisition device, generate the rotated image data, control the printing device based on the generated rotated image data to print the rotated image on the printing medium, and control the cutter assembly to cut the printing medium having the rotated image printed thereon, and wherein the controller is configured to, in a case where a non-cut command for not cutting the printing medium is appended to the image data acquired by the acquisition device, control the printing device to print the image on the printing medium based on the image data acquired by the acquisition device without generating the rotated image data and without controlling the cutter assembly to cut the printing medium.

\* \* \* \* \*